(12) United States Patent
Hsu

(10) Patent No.: US 8,724,311 B2
(45) Date of Patent: May 13, 2014

(54) PORTABLE ELECTRONIC DEVICE WITH CHIP CARD HOLDER

(75) Inventor: Chin-Yu Hsu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 124 days.

(21) Appl. No.: 13/457,729

(22) Filed: Apr. 27, 2012

(65) Prior Publication Data

US 2013/0258605 A1 Oct. 3, 2013

(30) Foreign Application Priority Data

Apr. 3, 2012 (CN) .......................... 2012 1 0095712

(51) Int. Cl.
*H04B 1/38* (2006.01)
*G06F 1/16* (2006.01)

(52) U.S. Cl.
CPC ............ *H04B 1/3816* (2013.01); *G06F 1/1601* (2013.01)
USPC ................ 361/679.4; 312/319.2; 165/104.33; 439/630

(58) Field of Classification Search
CPC .......... G06K 1/00; G06F 1/00; G06F 2003/00
USPC ............. 312/223.1, 223.2, 332.1, 319.2, 237, 312/223.3; 360/99.08, 235.4, 75, 128, 360/97.14, 97.22, 97.16; 165/80.2, 104.26, 165/104.14, 104.33, 80.3; 439/630, 541.5, 439/66; 361/695, 754, 737, 810, 679.33, 361/679.08, 679.34, 679.32, 679.35, 361/679.21, 679.09, 679.01, 679.46, 361/679.37, 679.31, 679.55, 679.36, 361/679.54, 679.02, 679.4, 679.38, 679.26, 361/679.06, 679.47, 679.16, 679.5, 679.43
See application file for complete search history.

(56) References Cited

U.S. PATENT DOCUMENTS

| | | | |
|---|---|---|---|
| 2006/0205279 A1* | 9/2006 | Pan ............................... | 439/630 |
| 2013/0235540 A1* | 9/2013 | Chang .......................... | 361/754 |
| 2013/0235548 A1* | 9/2013 | Chang .......................... | 361/810 |
| 2013/0250525 A1* | 9/2013 | Wang ........................... | 361/737 |

* cited by examiner

*Primary Examiner* — Hung Duong
(74) *Attorney, Agent, or Firm* — Novak Druce Connolly Bove + Quigg LLP

(57) ABSTRACT

A chip card holder for holding at least one chip card, includes a base, a drawer and a arm. The drawer is slidably attached to the base. The drawer defines a receiving space and a receiving groove communicating with the receiving space. The arm is rotatably attached in the receiving groove. When only one chip card is received in the receiving space, the arm rotates relative to the drawer until the arm is pressed on the chip card so the chip card is held in the receiving space by the arm; when two chip cards are stacked in the receiving space, the arm is attached in the receiving groove to prevent said two chip cards from sliding out of the receiving space through the receiving groove.

18 Claims, 6 Drawing Sheets

PORTABLE ELECTRONIC DEVICE WITH CHIP CARD HOLDER

BACKGROUND

1. Technical Field

The present disclosure relates to portable electronic devices, and particularly to portable electronic devices with chip card holders.

2. Description of Related Art

A dual-SIM mobile terminal may have one or two SIM cards. A dual-SIM mobile terminal with two SIM cards can switch SIM cards according to a user selection. A dual-SIM mobile terminal with two SIM cards can be used with two phone numbers.

Typical chip card holder define two side-by-side receiving grooves for receiving the SIM cards. Side-by-side grooves, however, occupying a large area of the mobile terminal. Additionally, in some cases, the user wants to use only one phone number. However, typical chip card holder can not be easily switched from two phone numbers mode to one phone number mode.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and portable electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
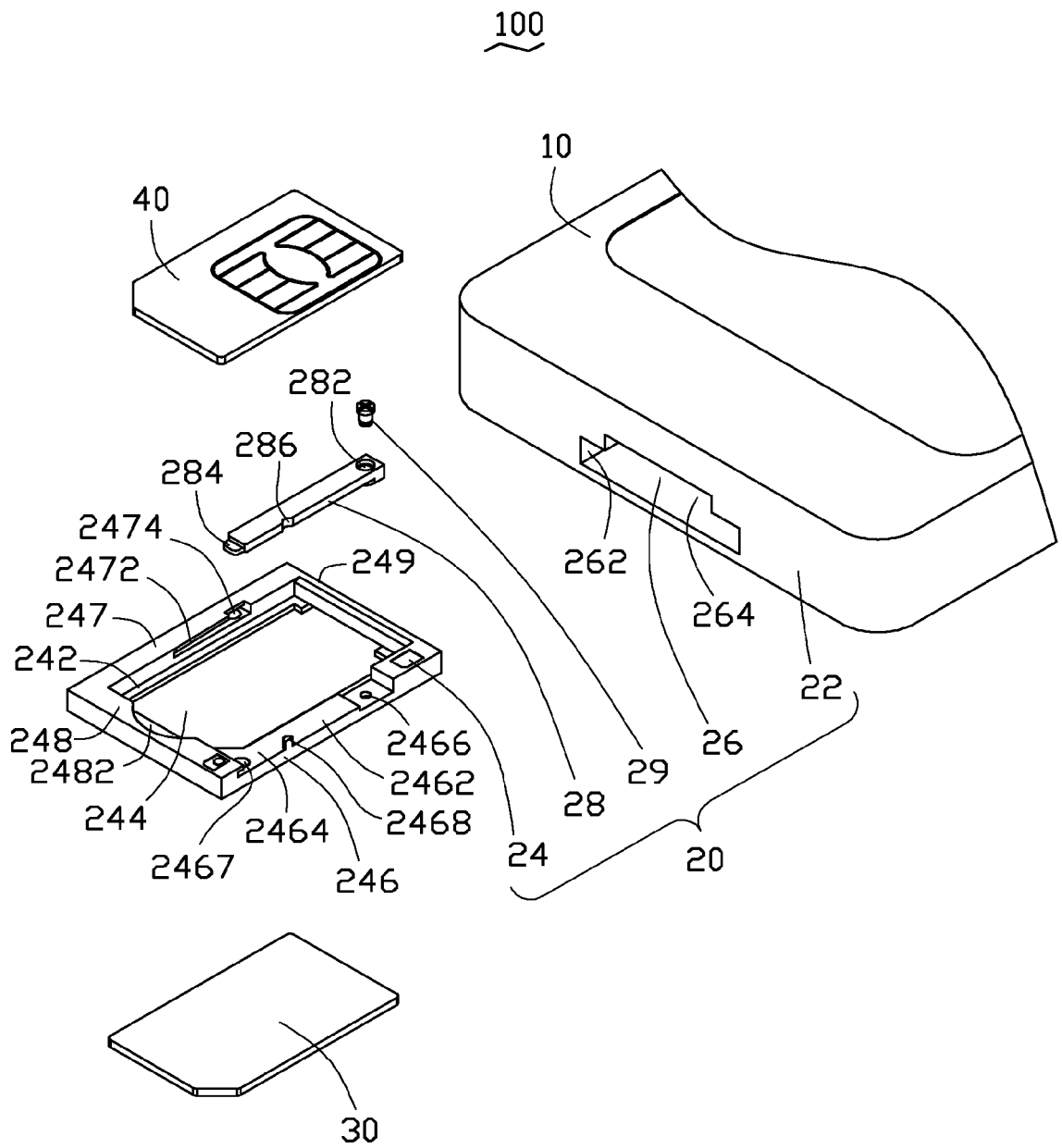
FIG. 1 is an exploded view of one embodiment of a chip card holder as used in a portable electronic device, the portion of the portable electronic device including a housing, two chip cards and a chip card holder.

Referring to FIGS. 1 to 4, an embodiment of a chip card holder 20 which can be used on a portable electronic device 100, such as a cellular phone or any electronic device where a chip card is required. The portable electronic device 100 includes a housing 10, a second chip card 40, a first electrical connector 50 and a second electrical connector 60. The chip card holder 20 is attached to the housing 10. A first chip card 30 and a second chip card 40 can both be attached to the chip card holder 20. The first chip card 30 and the second chip card 40 may both be subscriber identity modules (SIM) card or memory cards; or both. The first electrical connector 50, second electrical connector 60 are both attached to the housing 10.

The chip card holder 20 includes a base 22, a drawer 24, a cabinet 26, a arm 28 and a shaft 29. The cabinet 26 is defined in the base 22, in which the drawer 24 is slidably received. The arm 28 is rotatably attached to the drawer by the shaft 29.

The base 22 may be a portion of the housing 10 or a single element fixed to the housing 10. In this exemplary embodiment, the base 22 is a portion of the housing 10.

The drawer 24 defines a receiving space 242 and a passage 244. The receiving space 242 is for accommodating the first chip card 30 and the second chip card 40. In this exemplary embodiment, the receiving space 242 is enclosed by a first sidewall 246, a second sidewall 247 opposite to the first sidewall 246, a first end 248 and a second end 249 opposite to the first end 248.

The first sidewall 246 defines a receiving groove 2462. The receiving groove 2462 communicates with the receiving space 242. The arm 28 is received in the receiving groove 2462. The first sidewall 246 further defines a first shaft hole 2466 in a bottom 2464 of receiving groove 2462. The arm 28 defines a second shaft hole 282. The shaft 29 is inserted into the first shaft hole 2466 and the second shaft hole 282 so the arm 28 is rotatably attached to the drawer 24 about the shaft 29. In addition, a first magnet 2467 is attached to the first sidewall 246 and exposed into the receiving groove 2462. The arm 28 includes a magnetic portion 284, and is hold in the receiving groove 2462 by an attractive force between the magnetic portion 284 and the first magnet 2467. Furthermore, a protrusion 2468 protrudes from the bottom 2464 of the receiving groove 2462, a notch 286 is defined in the arm 28; the protrusion 2468 is received in the notch 286 to prevent the arm 28 from extending out of the drawer 24.

The second sidewall 247 defines a latching groove 2472. The latching groove 2472 communicates with the receiving space 242. After the arm 28 rotates about the shaft 29, the magnetic portion 284 can be latched in the latching groove 2472 so the arm 28 spans the receiving space 242 and holds the first chip card 30 in the receiving space 242 like shown in FIG. 4. To steadily hold the magnetic portion 284 in the latching groove 2472, a second magnet 2474 is attached to the second sidewall 247 and exposed in the latching groove 2472. Therefore, the arm 28 is stably held in the latching groove 2472 by an attractive force between the magnetic portion 284 and the second magnet 2474.

A slot 2482 is defined in the first end 248 and communicates with the receiving space 242. The slot 2482 facilitates an user gripping the first chip card 30 and the second chip card 40 received in the receiving space 242, thereby facilitating removing the first chip card 30 and the second chip card 40 out of the receiving space 242.

The cabinet 26 has a shape and size that can fittingly receive the drawer 24 therein, and includes a compartment 262 and an opening 264. The drawer 24 is slidably received in the compartment 262. The compartment 262 is enclosed by a first groove wall 2622 and a second groove wall 2624 opposite to the first groove wall 2622. The opening 264 communicates with the compartment 262. The drawer 24 can be inserted into or slide out of the compartment 262, through the opening 264.

The first electrical connector 50 is attached to the first groove wall 2622. The second electrical connector 60 is attached to the second groove wall 2624.

Figure 2:
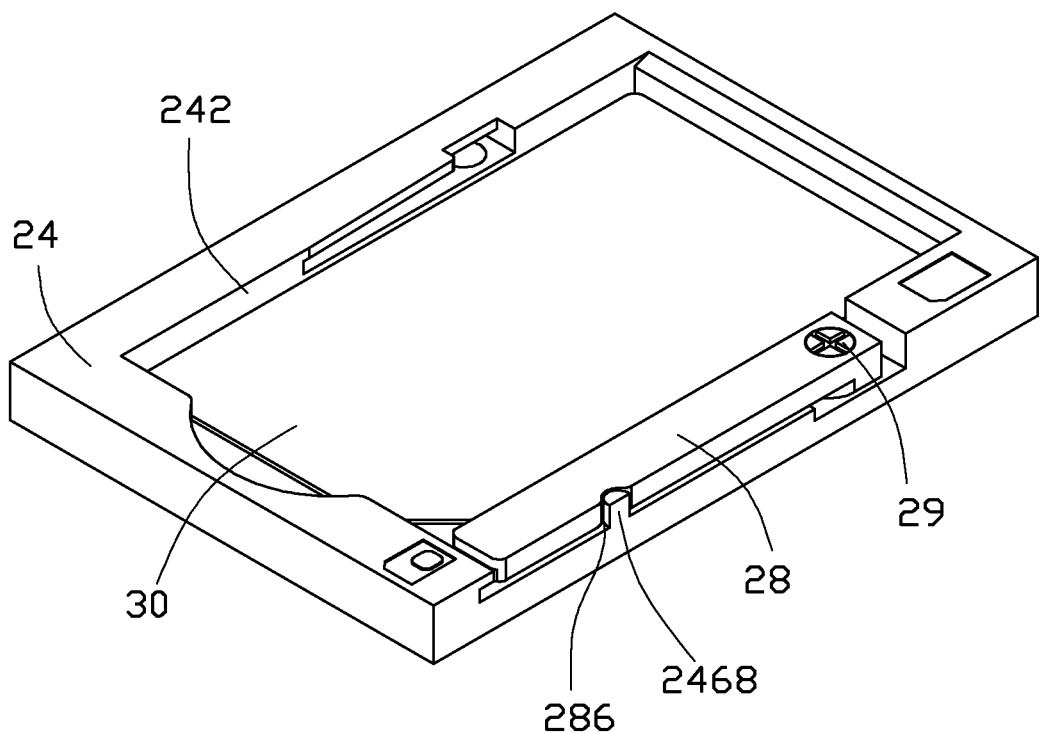
FIG. 2 is a schematic view of one of the chip cards received in a drawer of FIG. 1
Figure 3:
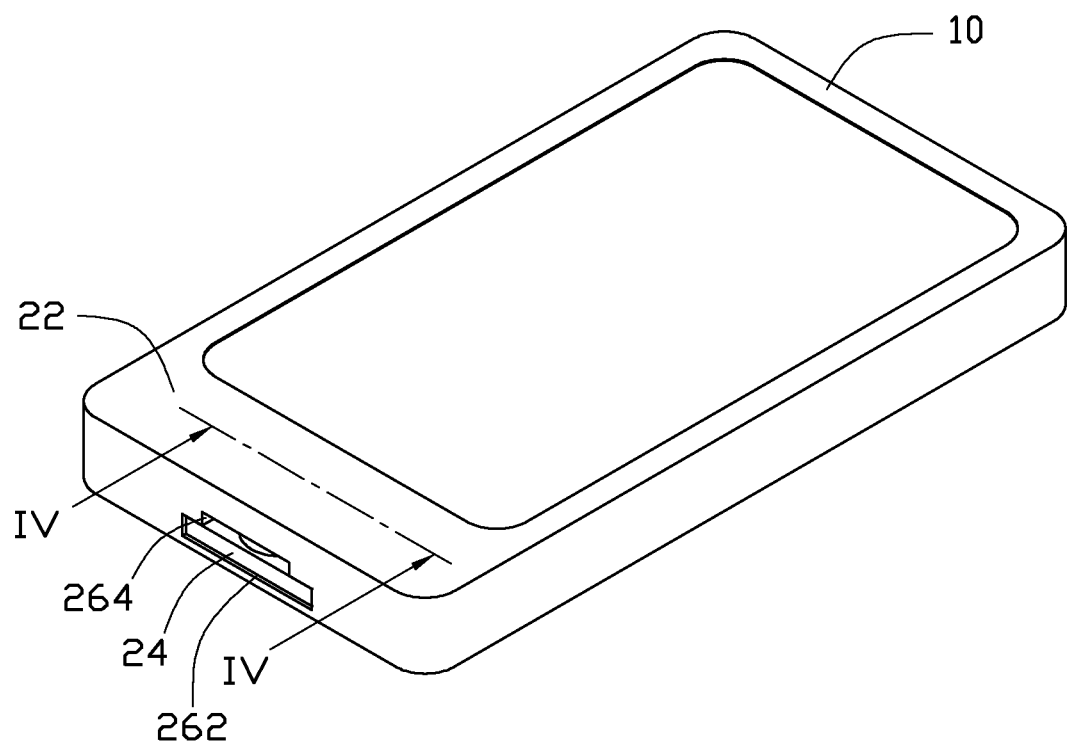
FIG. 3 is an assembled view of the portable electronic device of FIG. 1.
Figure 4:
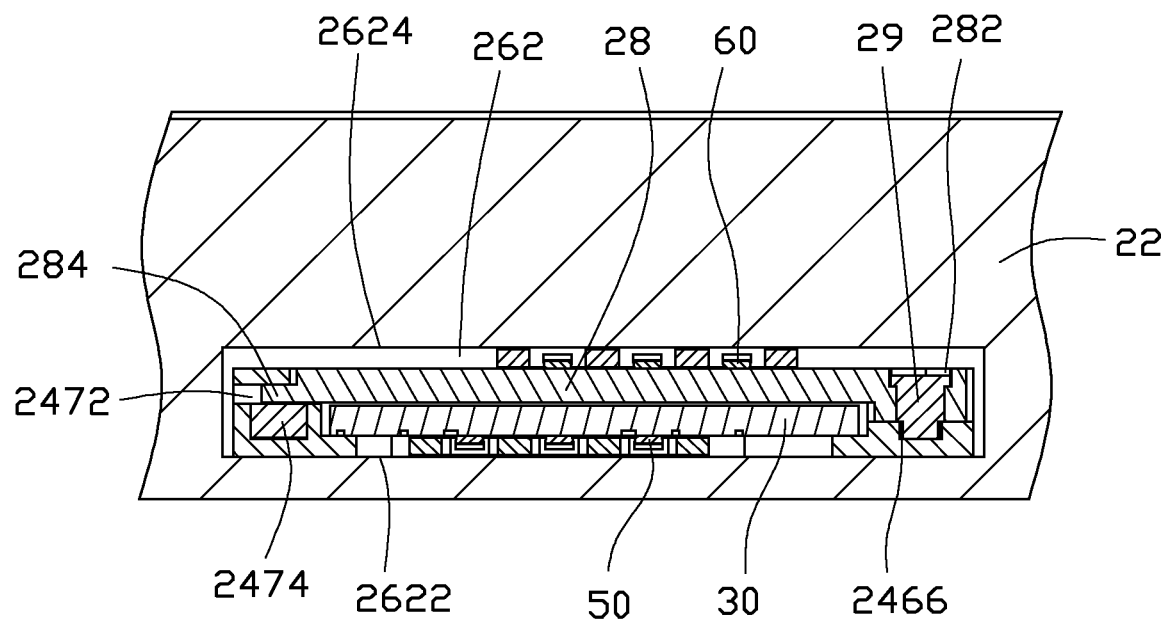
FIG. 4 is a cross sectional view of the portable electronic device of FIG. 3 along the line of IV-IV.

Referring to FIGS. 2 to 4, when only the first chip card 30 is used, the first chip card 30 is received in the receiving space 242. The arm 28 is pushed to overcome the attractive force between the first magnet 2467 and the magnetic portion 284, then the arm 28 rotates about the shaft 29 until the magnetic portion 284 rotates into the latching groove 2472. The magnetic portion 284 is attached to the second magnet 2474 so the magnetic portion 284 is steadily held in the latching groove 2472. At this time, the arm 28 resists against the first chip card 30 so the first chip card 30 is latched in the receiving space 242 by the arm 28. The drawer 24 is inserted into the cabinet until the first electrical connector 50 passes through the passage 244 to electrically connect to the first chip card 30, yielding putting the first chip card 30 in the housing 10.

Figure 5:
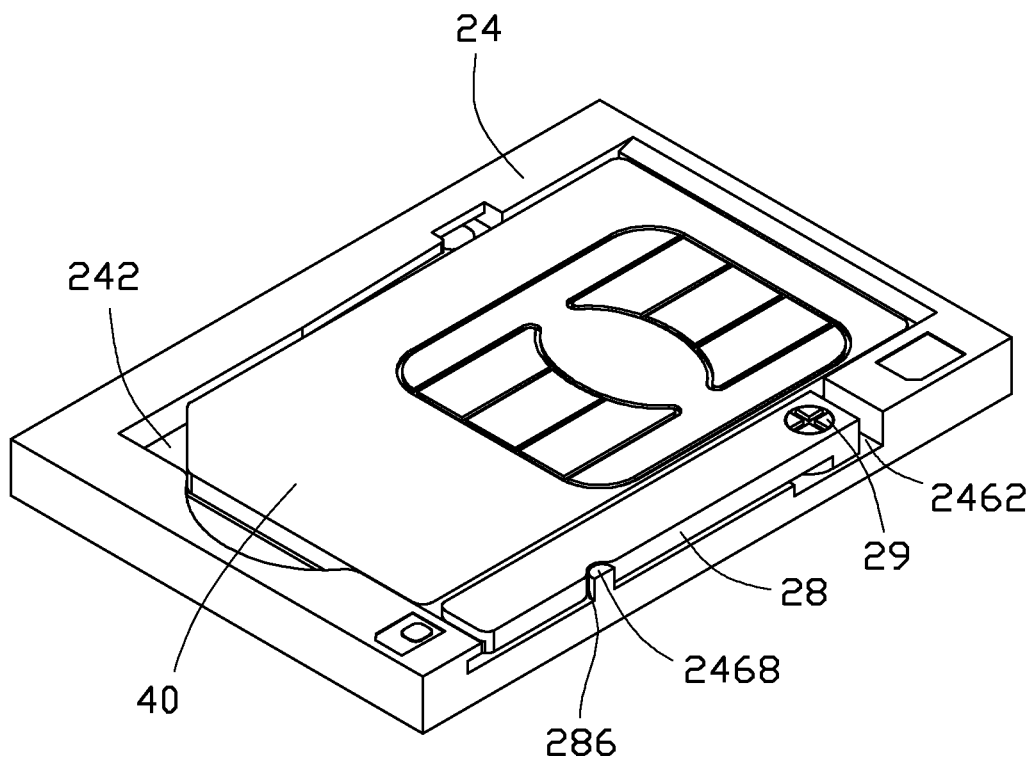
FIG. 5 is similar to FIG. 2, but the chip cards are both received in the drawer.
Figure 6:
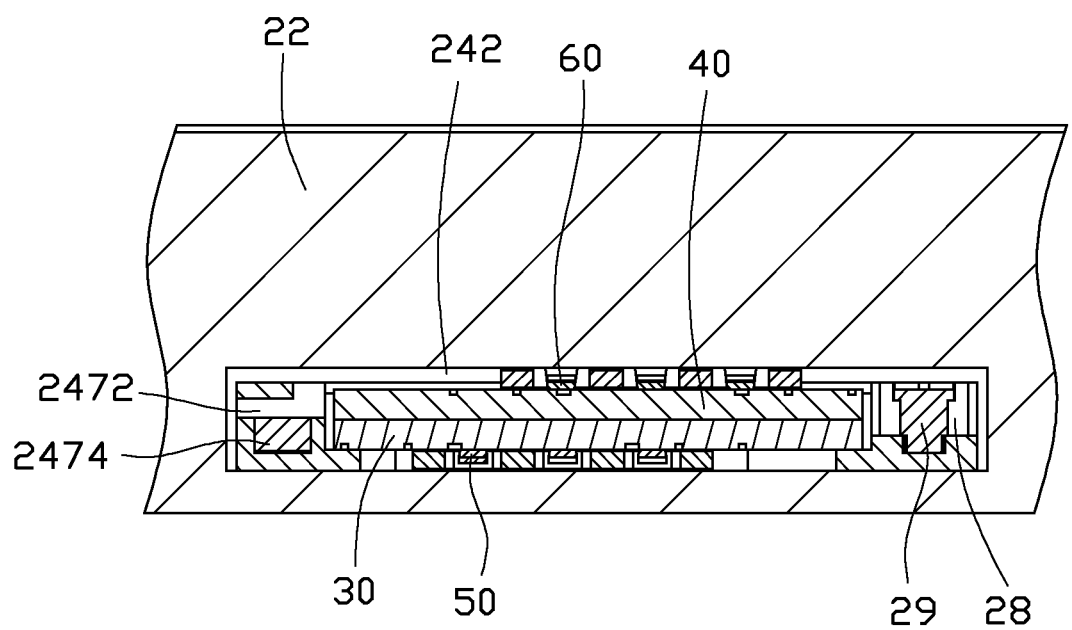
FIG. 6 is similar to FIG. 4, but the chip cards are both received in the drawer

Referring to FIGS. 5 and 6, when the first chip card 30 and the second chip card 40 are needed to be used simultaneously, the first chip card 30 and the second chip card 40 are received in the receiving space 242 in turn, e.g., the second chip card 40 is directly stacked on the first chip card 30. At this time, the magnetic portion 284 is attached to the first magnet 2467 so the arm 28 is steadily held in the receiving groove 2462, to prevent the first chip card 30 and the second chip card 40 from sliding out of the receiving space 242 through the receiving groove 2462. The drawer 24 is inserted into the cabinet until the first electrical connector 50 passes through the passage 244 to electrically connect to the first chip card 30, and the second electrical connector 60 electrically connects to the second chip card 40, thereby yielding putting the first chip card 30 and the second chip card 40 in the housing 10.

In above chip card holder 20, the drawer 24 can slide out of the cabinet 26 to expose it from the base 22, thereby facilitating grasping the first chip card 30 and the second chip card 40 out of the receiving space 242 or putting the first chip card 30 and the second chip card 40 in the receiving space 242. Additionally, the first chip card 30 and the second chip card 40 can be stacked in the receiving space 242, to reduce the area occupying by the chip card holder 20. Furthermore, when only one chip card, e.g., only the first chip card 30, is needed, the first chip card 30 can be steadily held in the receiving space 242 by the arm 28. Thus, the chip card holder 20 can be easily switched from two chip cards mode to one chip card mode.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder for holding at least one chip card, the chip card holder comprising:
   a base;
   a drawer slidably attached to the base, the drawer defining a receiving space and a receiving groove communicating with the receiving space;
   an arm rotatably attached in the receiving groove;
   wherein when only one chip card is received in the receiving space, the arm is rotated relative to the drawer until the arm spans over the receiving space and resists on a top surface of the chip card; when two chip cards are stacked in the receiving space, the arm is attached in the receiving groove and resists against a sidewall of the chip card.

2. The chip card holder of claim 1, wherein the receiving space is enclosed by a first sidewall, a second sidewall opposite to the first sidewall, a first end and a second end opposite to the first end; the receiving groove is defined in the first sidewall, the first sidewall further defines a first shaft hole, the arm defines a second shaft hole; a shaft is inserted into the first shaft hole and the second shaft hole so the arm is rotatably attached to the drawer about the shaft.

3. The chip card holder of claim 2, wherein a first magnet is attached in the receiving groove, the arm includes a magnetic portion; an attractive force between the magnetic portion and the first magnet holds the arm in the receiving groove.

4. The chip card holder of claim 3, wherein a protrusion protrudes from a bottom of the receiving groove, a notch is defined in the arm; the protrusion is received in the notch to prevent the arm from extending out of the drawer.

5. The chip card holder of claim 3, wherein the second sidewall defines a latching groove, the latching groove communicates with the receiving space; after the arm rotates about the shaft, the magnetic portion is latched in the latching groove so the arm holds the first chip card in the receiving space.

6. The chip card holder of claim 5, wherein a second magnet is attached in the latching groove so the magnetic portion is held in the latching groove by an attractive force between the magnetic portion and the second magnet.

7. The chip card holder of claim 3, wherein a slot is defined in the first end and communicates with the receiving space, the slot facilitates an user removing the first chip card and the second chip card out of the receiving space.

8. The chip card holder of claim 1, wherein the base defines a compartment, in which the drawer is slidably received.

9. The chip card holder of claim 8, wherein the compartment is enclosed by a first groove wall and a second groove wall opposite to the first groove wall; the drawer further includes a first electrical connector attached to the first groove wall, and a second electrical connector attached to the second groove wall; the first chip card electrically connects to the first electrical connector, the second chip card electrically connects to the second electrical connector.

10. A portable electronic device, comprising:
    a housing;
    a chip card holder comprising:
       a base fixed to the housing;
       a drawer slidably attached to the base, the drawer defining a receiving space and a receiving groove communicating with the receiving space;
       an arm rotatably attached in the receiving groove;
       at least one chip card received in the receiving space;
       wherein when only one chip card is received in the receiving space, the arm rotates relative to the drawer until the arm is pressed on the chip card so the chip card is held in the receiving space by the arm; when two chip cards are stacked in the receiving space, the arm is attached in the receiving groove to prevent said two chip cards from sliding out of the receiving space through the receiving groove.

11. The portable electronic device of claim 10, wherein the receiving space is enclosed by a first sidewall, a second sidewall opposite to the first sidewall, a first end and a second end opposite to the first end; the receiving groove is defined in the first sidewall, the first sidewall further defines a first shaft hole, the arm defines a second shaft hole; a shaft is inserted into the first shaft hole and the second shaft hole so the arm is rotatably attached to the drawer about the shaft.

12. The portable electronic device of claim 11, wherein a first magnet is attached in the receiving groove, the arm includes a magnetic portion; an attractive force between the magnetic portion and the first magnet holds the arm in the receiving groove.

13. The portable electronic device of claim 12, wherein a protrusion protrudes from a bottom of the receiving groove, a notch is defined in the arm; the protrusion is received in the notch to prevent the arm from extending out of the drawer.

14. The portable electronic device of claim 12, wherein the second sidewall defines a latching groove, the latching groove communicates with the receiving space; after the arm rotates about the shaft, the magnetic portion is latched in the latching groove so the arm holds the first chip card in the receiving space.

15. The portable electronic device of claim 14, wherein a second magnet is attached in the latching groove so the magnetic portion is held in the latching groove by an attractive force between the magnetic portion and the second magnet.

16. The portable electronic device of claim 12, wherein a slot is defined in the first end and communicates with the receiving space, the slot facilitates an user removing the first chip card and the second chip card out of the receiving space.

17. The portable electronic device of claim 10, wherein the base defines a compartment, in which the drawer is slidably received.

18. The portable electronic device of claim 17, wherein the compartment is enclosed by a first groove wall and a second groove wall opposite to the first groove wall; the drawer further includes a first electrical connector attached to the first groove wall, and a second electrical connector attached to the second groove wall; the first chip card electrically connects to the first electrical connector, the second chip card electrically connects to the second electrical connector.

* * * * *